Patented Apr. 7, 1953

2,634,296

UNITED STATES PATENT OFFICE 2,634,296

PRODUCTION OF BETA MONOETHERS OF GLYCEROLS

Rupert C. Morris, Berkeley, and John L. Van Winkle, San Lorenzo, Calif., assignors to Shell Development Company, San Francisco, Calif., a corporation of Delaware No Drawing. Application December 27, 1949, Serial No. 135,294

6 Claims. (Cl. 260—613)

This invention relates to a process for the preparation of ethers of glycerols. More particularly, the present invention relates to a process for the preparation of beta mono-ethers of glycerols carried out by selective hydrolysis of corresponding beta ethers of glycerol halohydrins. The invention in a more specific aspect especially concerns a process for the preparation in high yields of beta mono-ethers of olefinic alcohols with glycerols, by selectively hydrolyzing corresponding ethers of olefinic alcohols with glycerol dihalohydrins, or bis(halomethyl) carbinols, to directly produce the desired olefinic mono-ethers of glycerol.

Efficient methods are well-known for producing alpha mono-ethers of glycerol from halogen derivatives of glycerol, as by reaction of glycerol halohydrins or glycerol epihalohydrins with alcohols. Insofar as we are aware, no practical, efficient method is known in the prior art for producing beta mono-ethers of glycerols from the halogen derivatives, i. e., the glycerol halohydrins or epihalohydrins, or the ethers of the glycerol halohydrins. It has been reported that the beta methyl mono-ether of glycerol can be prepared by an indirect method from the methyl ether of glycerol alpha,gamma-dichlorohydrin. The method involves the intermediate preparation of the diacetate of the beta methyl mono-ether of glycerol (1,3-diacetoxy-2-methoxypropane), and the subsequent hydrolysis of this intermediate to obtain the desired glycerol ether. J. Am. Chem. Soc. 51, 1943 (1929). However, the reported procedure was cumbersome and the yield of the desired ether was low, making the method generally unsuited to technical production of the glycerol ether that was formed. There also have been reported attempts to hydrolyze the methyl ether of glycerol alpha,gamma-dichlorohydrin to produce directly the beta monomethyl ether of glycerol, thereby avoiding preparation of the intermediate diacetate compound, but the experiments were stated to be unsuccessful. J. Chem. Soc. (London) 1929, page 2232. See also, J. Chem. Soc. (London) 127, 2735 (1925).

The beta mono-ethers of glycerol are commercially valuable compounds having potentially important technical applications. In addition to their use as special solvents or as intermediates for the preparation of special solvents, their properties make them of value in certain cases as biologically active compounds, or as intermediates for the preparation of biologically active compounds, such as pharmaceuticals. Beta mono-ethers of glycerol with olefinic alcohols, especially with beta,gamma-olefinic alcohols, have been found to have properties which make them valuable raw materials for the preparation of improved resins and polymers which are useful, for example, in the preparation of improved air-drying surface coatings. Because of these and other useful properties of the beta mono-ethers of glycerols, there has been need for a commercially practical and efficient process for their synthesis. It has been desirable to have a process by which they can be prepared in high yields and in an efficient manner from such readily available raw materials as the glycerol halohydrins, or more particularly, from readily prepared ethers of glycerol dihalohydrins.

An object of the present invention is an improved method for the preparation of beta mono-ethers of glycerols, that is, of bis(hydroxymethyl) carbinols. A further object of the invention is a method for accomplishing such preparation via the selective hydrolysis of ethers of bis(halomethyl) carbinols to directly produce in high yields corresponding mono-ethers of bis(hydroxymethyl) carbinols. A method for selectively hydrolyzing ethers of olefinic alcohols with bis(halomethyl) carbinols wherein the ether linkage is activated by direct attachment of the ether-oxygen atom to the hydrocarbon radical of an olefinic alcohol, there being an olefinic group in the beta,gamma position with respect to the ether oxygen atom, thereby producing the corresponding beta mono-ether of the beta,-gamma-olefinic alcohol with the corresponding bis(hydroxymethyl) carbinol, is a particular object of the invention. Still further and related objects of the invention will be apparent from the nature of the disclosures.

It now has been discovered, and the process of this invention is based in part upon the discovery that, beta mono-ethers of the glycerol halohydrins can be directly converted by selective hydrolysis under controlled, selected conditions to produce the corresponding glycerol beta mono-ethers in high yields and conversions. It has been discovered in accordance with the invention that the beta mono-ethers of the glycerol halohydrins can be selectively hydrolyzed to the corresponding beta mono-ether of the glycerol by treatment with water under controlled non-alkaline conditions of pH, or acidity. In accordance with the invention, beta mono-ethers of glycerols, including even such ethers wherein the ether linkage is activated or sensitized by the direct attachment of a beta,gamma-olefinic hydrocarbon radical to the ether-oxygen atom, are directly prepared in advantageously high yields and conversions by hydrolyzing corresponding ethers of glycerol alpha-monohalohydrins and of glycerol alpha,gamma-dihalohydrins by heating the ether of the glycerol halohydrin with water in the liquid state at an elevated temperature under controlled neutral to mildly acidic conditions, preferably in the presence of buffer salts of non-gaseous acids having $pK_a$ values within the range of from about $pK_a$ 6.5 to about $pK_a$ 3.5. It has been found that treatment of the beta mono-ethers of glycerol halohydrins with water at elevated temperatures under such controlled non-alkaline conditions favors the selective hydrolysis of the halogen atom or atoms of the halohydrin ether, leading to the replacement thereof by hydroxyl, with negligible concomitant hydrolysis or rupture of the ether linkage, even in those cases in which the ether linkage is activated or sensitized, as stated above, by the direct attachment of a beta,gamma-olefinic hydrocarbon radical to the ether oxygen atom. Likely side reactions, such as removal of the halogen by dehydrohalogenation, cyclization reactions, and the like, are substantially obviated, resulting in virtually quantitative yields of the desired beta mono-ether of the glycerol based upon the amount of the halohydrin ether consumed.

The process of the invention is executed advantageously by mixing the beta-ether of the glycerol halohydrin with an excess of water containing sodium acetate or other salt of a strong base with a weak normally liquid-to-solid acid, and heating the resulting mixture in liquid state at about 175° C. under superatmospheric pressure. The heating of the mixture ordinarily will be continued until the reaction has gone to substantial completion. The desired beta monoether of the glycerol then is recovered from the reaction mixture according to any suitable method, for example, by direct fractional distillation, by steam distillation, by extraction of the reaction mixture with one or more solvents immiscible therewith, or combinations of such procedures. The process of the invention, because of the manipulative simplicity of the operations involved and because of the high yields of the desired product, provides a direct and commercially practical method for the synthesis of beta mono-ethers of glycerols that heretofore were obtainable only with considerable difficulty.

The following examples will illustrate the process of the invention. It will be appreciated that numerous specific embodiments of the invention are possible and, accordingly, that the examples are presented with the intent to illustrate rather than to limit the invention as it is defined in the hereto appended claims.

*Example I*

This example consists of two experiments. In the first experiment an attempt is made to hydrolyze the allyl ether of glycerol alpha-gamma-dichlorohydrin (allyl 1,3-dichloro-2-propyl ether) to produce the beta mono-allyl ether of glycerol, by heating the dichlorohydrin ether with an aqueous solution of sodium hydroxide. It is shown that negligible amounts, if any, of the desired mono-allyl ether of glycerol are obtained. In the second experiment there are illustrated the results that are obtained according to the process of the present invention, whereby the allyl ether of glycerol alpha, gamma-dichlorohydrin is successfully hydrolyzed in virtually quantitative yields to produce the desired beta allyl mono-ether of glycerol.

In the first of the two experiments, there are charged to a stainless steel autoclave provided with suitable mechanical stirrer, pressure gauge, thermometer, etc., 127 grams of the allyl ether of glycerol alpha,gamma - dichlorohydrin, 64 grams of sodium hydroxide and 570 grams of water, the sodium hydroxide and water being introduced as a solution of the caustic alkali in the water. The autoclave is closed and heated, with stirring of the contents, at 165° C. to 170° C. for 4.75 hours. The pressure within the autoclave is the autogenous pressure of the mixture at the reaction temperature, in this case about 110 pounds per square inch. At the end of the reaction time, the autoclave is cooled, the reaction mixture is withdrawn, and the nature of the reaction products determined. The mixture is found to contain 78 grams of salt (sodium chloride) showing that reaction has occurred, the amount of salt indicating that at least 89% of the glycerol dichlorohydrin ether charged has been consumed. However, the products, other than the salt, are found to consist of a water-soluble tar along with a water-soluble residue, apparently polymeric in nature. None of the desired beta mono-allyl ether of glycerol is found in the products.

In the second of the two experiments, there is charged to the autoclave used in the preceding run, 51 grams of the allyl ether of glycerol alpha,-gamma-dichlorohydrin and a solution prepared by dissolving 46 grams of sodium acetate (anhydrous) in 500 grams of water. The autoclave is closed and heated with stirring at 175° for 3.5 hours under the autogenous pressure of the mixture, in this case about 170 pounds per square inch. The autoclave then is cooled and opened and the nature of the products determined. It is found by titration of a test portion of the reaction mixture with silver nitrate for titratable chlorides that 78.5% of the glycerol dichlorohydrin ether charged has been hydrolyzed. The rest of the reaction mixture is partially distilled to flash off the water. The remaining salt cake is extracted with several portions of hot isopropyl alcohol. The combined extracts are fractionally distilled. There are recovered 26.2 grams of the beta allyl mono-ether of glycerol as a fraction distilling at about 110° C. to 112° C. under 2 millimeters of mercury pressure. The amount of the beta allyl mono-ether of glycerol recovered corresponds to a 65.5% conversion based upon the amount of the allyl ether of glycerol alpha,-gamma-dichlorohydrin charged and to a 95.1% yield based upon the amount of the allyl ether of glycerol alpha,gamma-dichlorohydrin ether consumed.

*Example II*

The following example also consists of two experiments. In the first experiment it is attempted to convert the allyl ether of glycerol alpha,gamma-dichlorohydrin to the beta mono-allyl ether of glycerol by heating the dichlorohydrin ether with an aqueous solution of sodium bicarbonate. It is shown that under the conditions employed no hydrolysis of the dichlorohydrin ether occurred. The second experiment provides a further illustration of the direct conversion of an allyl-type beta-ether of a glycerol halohydrin to the corresponding allyl-type beta-ether of glycerol that is realized according to the process of the present invention.

In these experiments there is employed the autoclave that was used in the experiments that are described under Example I. For the first experiment there are charged to the autoclave 80 grams of the allyl ether of glycerol alpha,-gamma-dichlorohydrin, 119 grams of sodium bicarbonate and 500 grams of water. The autoclave is closed and heated with stirring of the contents at 150° C. for two hours. The experiment is carried out at a pressure equal to the autogenous pressure of the reaction mixture, in this case about 120 pounds per square inch. At the end of the reaction time, the autoclave is cooled and the contents withdrawn. It is found by titration of a portion of the reaction mixture for titratable chlorides that no hydrolysis has occurred.

In the second experiment there are charged to the autoclave 102 grams of the allyl ether of gylcerol alpha,gamma-dichlorohydrin and a solution of 204 grams of sodium acetate trihydrate ($NaOOCCH_3 \cdot 3H_2O$) in 1000 grams of water. The autoclave is closed and heated with stirring at 175° C. for four hours at the autogenous pressure (about 170 pounds per square inch). The autoclave then is cooled, the contents are withdrawn, and a small portion analyzed for titratable chloride. It is found that about 90% of the glycerol dichlorohydrin ether charged has been consumed. The water is flashed from the rest of the reaction mixture, the residual salt cake is extracted with several portions of hot isopropyl alcohol and the combined extracts are fractionally distilled. There are recovered 60.2 grams of the beta allyl mono-ether of glycerol, an amount which corresponds to a 76.1% conversion to product of the glycerol dichlorohydrin ether charged. A certain amount of unreacted allyl ether of glycerol alpha-gamma-dichlorohydrin is carried over with the water flashed from the reaction mixture. When this unreacted material, which can be recovered and reutilized, is taken into account the yield of desired product is better than 90%, based upon the amount of the allyl ether of glycerol alpha,gamma-dichlorohydrin consumed.

Example III

This example illustrates the course of the reaction estimated by the pH of the reaction mixture during the hydrolysis and the extent of hydrolysis as a function of time. The experiment is carried out by charging to the autoclave used in the preceding examples, 51 grams of the allyl ether of glycerol alpha,gamma-dichlorohydrin, 102 grams of sodium acetate trihydrate and 500 grams of water. The autoclave is closed and heated with stirring at 175° C. Aliquots of the reaction mixture are withdrawn from the autoclave at intervals through a suitable valved outlet. The pH and the titratable chloride content of each aliquot is determined. Prior to the heating the mixture has a pH of 7 and is found to contain no titratable chlorides within the limits of accuracy of the titration. The following table shows the pH value (to the nearest tenth of a unit) of the reaction mixture and the extent of hydrolysis, as determined by the content of titratable chlorides, as the reaction progresses.

| Time, Min. | pH | Percent Hydrolysis |
|---|---|---|
| 10 | 6.4 | 2 |
| 20 | 5.9 | 5 |
| 30 | 5.6 | 11 |
| 40 | 5.3 | 18 |
| 50 | 5.1 | 29 |
| 60 | 4.9 | 41 |
| 70 | 4.8 | 52 |
| 80 | 4.6 | 61 |
| 90 | 4.5 | 68 |
| 100 | 4.4 | 73 |
| 120 | 4.3 | 80 |
| 150 | 4.3 | 87 |
| 200 | 4.2 | 90 |

The figures in the table show that in this particular experiment the reaction went to substantial completion in a reaction time of somewhat under three hours; however, a high conversion to the beta allyl monoether of glycerol already was obtained by the end of two hours' reaction time. When in this experiment the rate of hydrolysis (determined, for example, from a plot of the per cent hydrolysis given in the above table vs. time) is compared with the pH, it is found that there is a very marked, sharp increase in reaction rate when the pH falls to about 5.5 to 5.8, and that the rate further increases as the pH decreases until there is a decrease in rate due to approaching complete consumption of the starting material. This increase in rate is shown by the figures in the following table:

| pH | Reaction Rate (arbitrary units) |
|---|---|
| 7 | |
| 6.5 | 2.5 |
| 6.0 | 3.5 |
| 5.5 | 7.0 |
| 5.2 | 10.0 |
| 4.9 | 12.6 |

The results show that under the conditions of this experiment, it is advantageous to operate under conditions of acidity corresponding to a pH value less than about 5.5 to 6.0.

Example IV

This example, which also consists of two experiments, illustrates in one of the experiments the preparation of the beta allyl mono-ether of glycerol from the beta allyl mono-ether of glycerol alpha-monochlorohydrin according to the process of the invention. The second experiment included in the example illustrates the results obtained when the hydrolysis is attempted using a caustic alkali.

In the first experiment the beta allyl mono-ether of glycerol alpha-monochlorohydrin is heated at 90° C. to 95° C. for 18 hours with a slight excess over the calculated amount (based on the alkali) of a 22% solution of sodium hydroxide in water. At the end of this time titatration of a portion of the mixture for chlorides shows that 82% of the ether charged has been converted to products. The remaining portion of the mixture is made slightly acid by the addition of dilute hydrochloric acid and flash-distilled to separate water and volatile organic materials from inorganic salts and non-volatile residues. Upon attempted recovery of the beta allyl mono-ether of glycerol from the fraction taken overhead, none is found.

In the second experiment a further portion of the beta allyl mono-ether of glycerol alpha-monochlorohydrin is mixed with an approximately equivalent amount of potassium acetate and about 10 parts of water per part of ether. The mixture is heated under its autogenous pressure and with stirring in an autoclave at 165° C. to 175° C. for four hours. The water is flashed from the resulting mixture, the residual salt cake is extracted several times with hot isopropyl alcohol, and the combined extracts are fractionally distilled. The beta allyl mono-ether of glycerol is recovered in a yield and a conversion corresponding to the yields and conversions obtained in the experiments in Examples I to IV conducted according to the method of the present invention.

Example V

To the autoclave employed in Examples I to IV there are charged 125 grams of the isopropyl ether of glycerol alpha,gamma-dichlorohydrin, 130 grams of sodium acetate, and 1000 grams of water. The autoclave is closed and heated with stirring of the contents at 190° C. for four hours. The autoclave is cooled and the contents withdrawn. The mixture is flash-distilled to remove the water and the residual salt cake is extracted with several portions of hot acetone. The combined extracts are fractionally distilled under reduced pressure. After taking the isopropyl alcohol overhead, the beta isopropyl mono-ether of glycerol is recovered as a sharply boiling fraction in good conversion and yield based upon the amount of isopropyl ether of glycerol alpha,gamma-dichlorohydrin applied and consumed, respectively.

In this example there can be employed instead of the isopropyl ether of glycerol alpha,gamma-dichlorohydrin, other ethers of saturated aliphatic alcohols with glycerol alpha,gamma-dichlorohydrin or of glycerol alpha,mono-chlorohydrin, specifically the methyl, ethyl, propyl, sec-butyl, pentyl, decyl, or even tetradecyl ethers thereof.

Example VI

This example illustrates application of the process of the invention to the hydrolysis of an aryl-type ether or glycerol alpha,gamma-dichlorohydrin to produce the corresponding beta aryl mono-ether of glycerol. There are charged to an autoclave similar to the one used in the foregoing examples 250 grams of the o-cresyl ether of glycerol alpha,gamma-dichlorohydrin, 300 grams of sodium acetate, and 2000 grams of water. The autoclave is closed and the mixture is heated with stirring under its autogenous pressure at 175° C. for 4.5 hours. The autoclave is then cooled, the contents withdrawn, and worked up in the manner used in the preceding example. The beta o-cresyl mono-ether of glycerol is recovered in excellent yield based upon the amount of dichlorohydrin ether charged. Only negligible amounts of undesired by-products are found.

In place of the o-cresyl ether of glycerol alpha,gamma-dichlorohydrin used in the preceding example, other aryl-type beta-ethers of glycerol halohydrins may be used, e. g., the phenyl, the m-cresyl, the benzyl, the naphthyl, the guaiacyl, the carvarcyl, the thymyl, and the like ethers of glycerol alpha,gamma-dichlorohydrin and of glycerol alpha-monochlorohydrin.

Example VII

To the autoclave employed in Examples I to VI there are charged 100 grams of the methallyl ether of glycerol alpha,gamma-dichlorohydrin, and 2000 grams of a solution of 400 grams of disodium hydrogen phosphate (anhydrous basis) in water, to which has been added sufficient syrupy phosphoric acid to bring the pH to 6.1. The autoclave is closed and heated with agitation of the contents at 155° C. to 160° C. for two hours. The autoclave is then cooled and the contents withdrawn. The water is flashed from the mixture leaving a residual moist salt cake. The salt cake is suspended in about 2.5 liters of isobutyl alcohol to extract organic products, the suspension is filtered and the solids washed on the filter with a small additional amount of isobutyl alcohol. The combined filtrate and washing then are fractionally distilled under reduced pressure. After taking a forecut of isobutyl alcohol and traces of light-end products, a fraction consisting essentially of pure beta methallyl mono-ether of glycerol is collected. The yield and conversion compares favorably with the yields and conversions that were obtained in the experiments in Examples I to IV illustrating the process of the invention. In this example there can be substituted for the methallyl ether of glycerol alpha,gamma-dichlorohydrin other allyl-type (or beta,gamma-olefinic) beta-ethers of glycerol halohydrins, for example, crotyl ether of glycerol alpha,gamma-dichlorohydrin, beta methallyl ether of glycerol alpha-monochlorohydrin, (beta-ethylallyl) ether of beta-methylglycerol-alpha,gamma-dichlorohydrin, beta cinnamyl mono-ether of glycerol alpha-bromohydrin, 3-chloroallyl ether of glycerol alpha,gamma-dichlorohydrin, and (2-ethyl-3-propylallyl) ether of glycerol alpha,gamma-dichlorohydrin.

The process of the present invention is generally applicable to the preparation of beta mono-ethers of glycerols, which may also be referred to as the ethers of bis(hydroxymethyl) carbinols, by hydrolysis of corresponding ethers of glycerol halohydrins. The glycerol halohydrins, ethers of which are directly hydrolyzed according to the process of the invention, may also be referred to as ethers of bis(halomethyl) carbinols when reference is made to the ethers of glycerol alpha,gamma-dihalohydrins, and as ethers of hydroxymethyl-halomethyl carbinols when reference is made to the beta mono-ethers of the glycerol alpha- or gamma-monohalohydrins. Although the etherifying radical, that is, the alcohol radical which substitutes the hydroxyl hydrogen atom on the etherified or combined hydroxyl radical of the halohydrin, may be the radical of a saturated aliphatic, a cycloaliphatic, or even an aromatic alcohol or phenol, it is particularly preferred to employ in the process of the invention the ethers of beta,gamma-olefinic alcohols with the glycerol halohydrins of the hereinbefore and hereinafter defined character. It is a distinct and unforeseen advantage of the present invention that the unsaturated ethers forming this preferred group can be successfully and directly hydrolyzed to the corresponding beta-ethers of beta-gamma-olefinic alcohols with glycerols without rupture or degradation of the sensitized or activated ether linkage and without the occurrence of side reactions leading to formation of products other than the desired glycerol unsaturated beta-ether. Representative beta-gamma-olefinic alcohol ethers of glycerol halohydrins include among others the following: the allyl ether of glycerol alpha,gamma-dichlorohydrin, the allyl ether of glycerol alpha,gamma-dibromohydrin, the allyl ether of beta-ethylglycerol alpha,gamma-dichlorohydrin, the allyl ether of beta-methylglycerol alpha,gamma-dichlorohydrin, the allyl ether of beta-hexylglycerol alpha,gamma-dichlorohydrin, the methallyl ether of beta-methylglycerol alpha,gamma-dichlorohydrin, the 2-ethyl-2-propenyl ether of glycerol alpha,gamma-dichlorohydrin, the 2-butyl-2-propenyl ether of beta-octylglycerol alpha,gamma-dichlorohydrin, the 2-octyl-2-propenyl ether of glycerol alpha,gamma-dichlorohydrin, the cinnamyl ether of glycerol alpha,gamma-dibromohydrin and their various homologs and analogs. The corresponding ethers of beta,gamma-olefinic alcohols with glycerol alpha-monohalohydrins may be employed.

While the ethers of beta,gamma-olefinic alcohols with glycerols which are prepared according to the invention are of particular value because of their unsaturated structure, for example, as intermediates for the preparation of improved polymers and interpolymers, glycerol beta-ethers wherein the etherifying radical is the radical of a saturated or even an aromatic alcohol or a phenol may be prepared according to the process of the invention. Representative beta-ethers of glycerol wherein the etherifying radical is that of a saturated alcohol include, for example, beta ethyl mono-ether of glycerol, beta propyl mono-ether of glycerol, beta isopropyl mono-ether of glycerol, beta 2-hydroxyethyl mono-ether of glycerol, beta 2-methoxyethyl mono-ether of glycerol, beta dodecyl mono-ether of glycerol, beta cyclohexyl mono-ether of glycerol, beta octadecyl mono-ether of glycerol, and beta methoxyethoxyethyl mono-ether of glycerol. The corresponding ethers of glycerol monohalohydrins as well as of glycerol dihalohydrins may be employed for the preparation of the foregoing and analogous glycerol beta-ethers according to the process of the invention. Aryl-type beta mono-ethers of glycerol which can be prepared according to the invention, include the phenyl, the o-cresyl, the m-cresyl, the p-cresyl, the o-nitrophenyl, the 2,4-dinitrophenyl, the o-cyclohexyphenyl, the naphthyl, and the like. Many of these aryl-type ethers of glycerol which can be prepared according to the process of the invention are of interest by reason of their pharmaceutical properties.

While the process is generally applicable to ethers of halohydrins in which the halogen atom or atoms is or are bromine, chlorine, and/or iodine, it is particularly preferred according to the invention to employ the ethers of the glycerol chlorohydrins.

Suitable mono-ethers of glycerol halohydrins may be prepared according to methods that are well-known to those skilled in the art, for example, by etherifying the glycerol dihalohydrin by treatment with a suitable hydrocarbon halide according to the so-called Williamson synthesis. The ethers of beta,gamma-olefinic alcohols with the glycerol dihalohydrins advantageously are prepared by reacting a hydrocarbon halide of the allyl-type with a glycerol epihalohydrin in the presence of a cupreous catalyst according to the method disclosed and claimed in the copending application Serial No. 65,064, filed December 13, 1948, now Patent 2,608,586.

In the execution of the process of the present invention, the temperature that is employed should be sufficiently elevated to achieve a practical rate of reaction but not so high that undesired side reactions or break-down of the organic materials present would be favored. Temperatures of from about 100° C. up to about 300° C. are suitable, a preferred range being from about 125° C. to about 225° C. Since the reaction is conducted with the reactants in the liquid state, the pressure that is employed will be sufficient to maintain the reaction mixture in the liquid state at the operating temperature. The pressure conveniently may be the autogenous pressure of the reaction mixture at the reaction temperature; however, pressures above the autogenous pressure may be applied, if desired, for example, by introduction of an inert gas under pressure into the reaction chamber.

As shown in the example, the process of the invention is conducted under controlled acidic conditions, preferably in the presence of buffer salts which serve to assist in maintaining the pH of the reaction mixture within a desired range. It is preferred to carry out the hydrolysis by treatment of the ether of the glycerol halohydrin in a solution in water of a buffer salt or a mixture of buffer salts, preferably salts of acids having $pK_a$ values (when determined in water) within the range of $pK_a$ 6.5 and $pK_a$ 3.5. The regulatory action or control exerted by the buffer salt upon the pH of the reacting mixture, serving to maintain the pH within a desired range, favors not only optimum rates of reaction but also reduces the possible occurrence of undesired side reactions and, therefore, leads to maximal yields of and conversions to desired product. Suitable buffer salts which can be employed include among others the following: sodium acetate, potassium acetate, mixtures of mono and disodium phosphates, mixtures of mono-potassium and dipotassium phosphates, sodium citrate, sodium benzoate, disodium pyrophosphate, sodium tartrate, and like salts of strong alkalies with weak non-gaseous acids. It is important that the hydrolysis of the ether of the glycerol halohydrin be carried out within defined ranges of pH. The pH preferably is maintained within the range of from 7 down to about 1.5, a preferred range being from about 6.0 to about 2.5. The buffer salt desirably is so selected and is used in such an amount that the pH of the hydrolysis mixture is maintained within the desired range during the course of the reaction. The minute concentrations of hydrogen ion in the reaction mixture appear within these limits to catalyze the desired selective hydrolysis reaction. According to one aspect, the process of the invention thus involves hydrolyzing the selected ether of a glycerol halohydrin by treatment with water under acid conditions in the presence of the hydrogen ion as catalyst for the reaction. In order to maintain optimum control or regulation of the concentration of the hydrogen ion, a buffer salt preferably is provided, the salt preferably being employed in an amount upwards from one-half of the amount equivalent to the chloride content of the halohydrin ether. Thus, when it is desired to convert an ether of a glycerol alpha,gamma-dihalohydrin to the corresponding beta mono-ether of glycerol, the amount of buffer salt preferably will be upwards from one equivalent per mole of the ether. When it is desired to convert according to the process of the invention a mono-ether of a glycerol mono-halohydrin to the corresponding beta mono-ether of glycerol, upwards from one-half equivalent of buffer salt per mole of the ether desirably is employed. It is preferred to employ an amount of buffer salt substantially equivalent to the halogen content of the glycerol halohydrin ether to be hydrolyzed. Ordinarily there will be employed not over about 10, and preferably not over about 2 equivalents of buffer salt based upon the halogen content of the halohydrin ether. Reference herein and in the appended claims to a number of equivalents of buffer salt is intended to refer to the equivalents calculated with respect to combination with the hydrogen or the hydroxyl ion within the pH range contemplated.

The amount of water may be varied over relatively wide limits, although for practical reasons it is desirable to maintain the amount of water used within reason. The amount of the water required by the reaction should, of course, be supplied. Extremely large amounts of water may be used. However, since in the presence of excessive amounts of water recovery of the desired products may be complicated, it is preferable to limit the amount of water used to not over about 50 parts per part of the glycerol halohydrin ether employed. Ordinarily the buffer salt will be completely dissolved in the water; however, in other cases the amount of water may be somewhat less than sufficient to entirely dissolve the amount of buffer salt employed.

The time required for bringing the reaction to substantial completion will depend in part upon the particular glycerol halohydrin ethers to be hydrolyzed and in part upon the particular reaction conditions used, e. g., the temperature. As illustrated in one of the examples, the course of the reaction may be followed conveniently by withdrawing aliquots of the reaction mixture and suitably analyzing them to determine the extent of reaction. At the termination of the reaction, the desired beta-ether of glycerol may be recovered from the reaction mixture according to any suitable method such as by fractional distillation, by crystallization, by treatment with selective solvents, by steam distillation, and combinations thereof and the like. Any unreacted halohydrin ether present in the final reaction mixture may be recovered and recycled with fresh feed.

The process of the invention can be carried out batchwise, intermittently, or continuously. When the process is executed in the presence of a buffer salt, as hereinbefore described, the hydrogen halide liberated in and by the hydrolysis of the ether of glycerol halohydrin combines or reacts with the buffer salt to convert it, at least in part, to the weak acid to which the anion of the buffer salt corresponds, with concomitant formation of a halide salt. Employing, for purposes of illustration, the allyl ether of glycerol alpha,gamma-dichlorohydrin and sodium acetate, the probable reactions (which occur substantially simultaneously) are as follows:

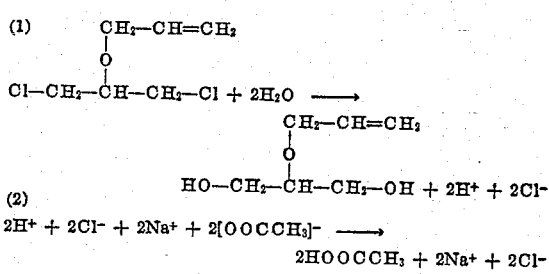

Preferably after recovery of the desired glycerol ether, the halide salt formed as indicated in Equation 2 can be separated from the weak acid by suitable procedures, such as by crystallization of the salt, by vaporization of the acid (in the case of volatile acids), or other known methods. The weak acid can be neutralized with an alkali, e. g., NaOH or KOH, and the thus-formed salt of the weak acid recycled to the hydrolysis step of the process, providing the advantage that negligible consumption of the buffer salt per se occurs in the over-all process. Such a cyclic process, which may also include the recycle of any separated unreacted ether of glycerol halohydrin, can be practiced in either a batchwise, an intermittent, or a continuous manner.

It will be appreciated that the invention is susceptible to many specific modifications by those skilled in the art and, accordingly, that the invention is intended to be regarded as broadly as the prior art permits with reference to the claims appended hereto.

We claim as our invention:

1. The method of preparing the beta allyl mono-ether of glycerol which comprises mixing the allyl ether of glycerol alpha,gamma-dichlorohydrin with a solution of from about one-half to about two equivalents, based upon the halogen of said allyl ether of glycerol alpha,gamma-dichlorohydrin, of sodium acetate in water and heating the mixture at a pH within the range of from about pH 2.5 to about pH 6.0 under the autogenous pressure of the reaction mixture at a temperature of from about 125° C. to about 225° C. until said beta allyl mono-ether of glycerol is formed.

2. The method of preparing a beta mono-ether of glycerol with a member of the group consisting of alcohols and phenols which comprises heating the corresponding ether of glycerol alpha,gamma-dichlorohydrin with a member of the group consisting of alcohols and phenols in admixture with a solution in water initially of from about one-half to about two equivalents of sodium acetate, based upon the halogen of said corresponding ether of glycerol alpha,gamma-dichlorohydrin, at a pH within the range of from pH 1.5 to pH 7 under the autogenous pressure of the mixture at a temperature of from about 100° C. to about 300° C. until said beta mono-ether of glycerol is formed.

3. The method of preparing the beta mono-allyl ether of glycerol which comprises heating the allyl ether of glycerol alpha,gamma-dichlorohydrin in admixture with a solution in water of a salt of a strong alkali and a non-gaseous acid characterized by a $pK_a$ value for the acid within the range of from about $pK_a$ 6.5 to about $pK_a$ 3.5 in an amount so as to buffer the solution during reaction to an acidity represented by a pH value not less than about 2.5 and not greater than about 6.0 and continuing the heating until said beta mono-allyl ether of glycerol is formed.

4. The method of preparing a beta alkyl mono-ether of glycerol which comprises heating the corresponding alkyl ether of glycerol alpha,gamma-dichlorohydrin in admixture with a solution in water of a salt of a strong alkali and a non-gaseous acid characterized by a $pK_a$ value for the acid within the range of from about $pK_a$ 6.5 to about $pK_a$ 3.5 in an amount so as to buffer the solution during reaction to an acidity represented by a pH value not less than about 2.5 and not greater than about 6.0 and continuing the heating until said beta alkyl mono-ether of glycerol is formed.

5. The method of preparing a beta aryl mono-ether of glycerol which comprises heating the corresponding aryl ether of glycerol alpha,gamma-dichlorohydrin in admixture with a solution in water of a salt of a strong alkali and a non-gaseous acid characterized by a $pK_a$ value for the acid within the range of from about $pK_a$ 6.5 to about $pK_a$ 3.5 in an amount so as to buffer the solution during reaction to an acidity represented by a pH value not less than about 2.5 and not greater than about 6.0 and continuing the heating until said beta aryl mono-ether of glycerol is formed.

6. The method of preparing the beta mono-ether of glycerol with a beta,gamma-olefinically unsaturated alcohol which comprises heating the corresponding ether of glycerol alpha,gamma-dihalohydrin with the beta,gamma-olefinically unsaturated alcohol in admixture with water in liquid state buffered by a salt of a strong base and a non-gaseous weak acid in solution therein to a pH value between 1.5 and 7 at a temperature of from about 100° C. to about 300° C. until said beta mono-ether of glycerol is formed.

RUPERT C. MORRIS.
          JOHN L. VAN WINKLE.

REFERENCES CITED

The following references are of record in the file of this patent:

UNITED STATES PATENTS

| Number | Name | Date |
|---|---|---|
| 1,259,758 | McElroy | Mar. 19, 1918 |
| 1,402,317 | Rodebush | Jan. 3, 1922 |
| 1,466,665 | McElroy | Sept. 4, 1923 |
| 2,148,304 | Ruys et al. | Feb. 21, 1939 |
| 2,318,032 | Van de Griendt et al. | May 4, 1943 |
| 2,543,952 | Allenby | Mar. 6, 1951 |
| 2,608,586 | Ballard et al. | Aug. 26, 1952 |